Patented Nov. 30, 1943

2,335,585

UNITED STATES PATENT OFFICE 2,335,585

MANUFACTURE OF TARTAR EMETIC EMPLOYING ANTIMONY METAL

Newell A. Davies, Burlingame, Calif., assignor to American Cream Tartar Co., a corporation of California No Drawing. Application April 25, 1942, Serial No. 440,528

8 Claims. (Cl. 260—446)

This invention relates to the manufacture of antimonyl derivatives of saturated aliphatic acids containing an alpha hydroxy group. While the invention will be particularly described in connection with the manufacture of tartar emetic, potassium antimonyl tartrate, it is not limited thereto.

Tartar emetic is usually made by heating an aqueous solution of potassium bitartrate with freshly prepared antimony trioxide under reflux for several hours. The reactivity of the several components is such that the reaction rate is very low. Further, the oxidation of antimony to antimony oxide, as a separate step, adds an additional expense, particularly in the loss of antimony as antimony pentoxide.

I have discovered that in place of employing antimony oxide one can employ antimony metal as such providing a suitable oxidizing agent is present during the course of the reaction. As such an oxidizing agent I have successfully employed nitric acid because it is cheap, effective, and easy to obtain. Other suitable oxidizing agents can be employed in place of nitric acid, as will presently be set forth.

The invention will be made further apparent upon considering the following specific example wherein the invention was practiced in the manufacture of tartar emetic. Fifty parts by weight of antimony metal were finely divided by stamping and screening through a 36-mesh screen. This was added to a vessel, together with sufficient dilute nitric acid to provide 25.8 parts by weight of nitric acid on an absolute basis. An aqueous solution of potassium bitartrate containing 77 parts by weight of the tartrate were added. This mixture was heated to its boiling point and refluxed for eleven hours. At the end of this time the mixture was evaporated to increase its concentration, to a gravity of about 20° Bé., and then cooled. An 85.3% yield of tartar emetic was secured with 7.6 parts by weight of antimony metal remaining unreacted. This can be reused. During the course of the reaction, some nitric oxide, NO, was evolved. While this was not recovered, it could be for subsequent utilization or conversion into nitric acid.

In place of the potassium bitartrate, any other suitable salt of tartaric acid can be employed, or any other suitable salt of a saturated aliphatic acid containing an alpha hydroxy group such as citric acid, malic acid, or any of the other saturated aliphatic acids containing an alpha hydroxy group as are fully disclosed in the Mohr Patents 2,281,784 through 2,281,787 of May 5, 1942.

In place of nitric acid one can employ persulfuric acid, nitrous acid, and the oxy-halogen acids including hypochlorous acid, chlorous acid, per-chloric acid, hypobromous acid, bromic acid, hypoiodous acid and iodic acid.

I claim:

1. In the manufacture of antimonyl derivatives of a saturated aliphatic acid containing an alpha hydroxy group, the step of heating an aqueous solution of a salt of said acid with finely divided antimony in metallic form, in the presence of sufficient nitric acid to oxidize said metal, for a time sufficient to form an antimonyl derivative of said acid.

2. In the manufacture of antimonyl derivatives of tartaric acid, the step of heating an aqueous solution of a salt of tartaric acid with finely divided antimony in metallic form, in the presence of sufficient nitric acid to oxidize said metal, for a time sufficient to form an antimonyl derivative of tartaric acid.

3. In the manufacture of antimonyl derivatives of citric acid, the step of heating an aqueous solution of a salt of citric acid with finely divided antimony in metallic form, in the presence of sufficient nitric acid to oxidize said metal, for a time sufficient to form an antimonyl derivative of citric acid.

4. In the manufacture of antimonyl derivatives of malic acid, the step of heating an aqueous solution of a salt of malic acid in liquid phase with finely divided antimony in metallic form, in the presence of sufficient nitric acid to oxidize said metal, for a time sufficient to form an antimonyl derivative of malic acid.

5. In the manufacture of antimonyl derivatives of malic acid, the step of heating an aqueous solution of a salt of malic acid with finely divided antimony in metallic form, in the presence of an oxidizing agent for said metal, for a time sufficient to form an antimonyl derivative of malic acid, said oxidizing agent being selected from the group consisting of nitric acid, chloric acid and perchloric acid.

6. In the manufacture of antimonyl derivatives of tartaric acid, the step of heating an aqueous solution of a salt of tartaric acid with finely divided antimony in metallic form, in the presence of an oxidizing agent for said metal, for a time sufficient to form an antimonyl derivative of tartaric acid, said oxidizing agent being selected from the group consisting of nitric acid, chloric acid and perchloric acid.

7. In the manufacture of antimonyl derivatives of citric acid, the step of heating an aqueous solution of a salt of citric acid with finely divided antimony in metallic form, in the presence of an oxidizing agent for said metal, for a time sufficient to form an antimonyl derivative of citric acid, said oxidizing agent being selected from the group consisting of nitric acid, chloric acid and perchloric acid.

8. In the manufacture of antimonyl derivatives of a saturated aliphatic acid containing an alpha hydroxy group, the step of heating a salt of said acid in liquid phase with finely divided antimony in metallic form, in the presence of an oxidizing agent for said metal, for a time sufficient to form an antimonyl derivative of said acid, said oxidizing agent being selected from the group consisting of nitric acid, chloric acid and perchloric acid.

NEWELL A. DAVIES.